(12) United States Patent
Bacon et al.

(10) Patent No.: US 12,208,928 B2
(45) Date of Patent: Jan. 28, 2025

(54) SPACECRAFT HEAT SHIELD

(71) Applicant: Space Forge Limited, Cardiff South Glamorgan (GB)

(72) Inventors: Andrew Paul Bacon, Gloucestershire (GB); Oliver David Turner, Newcastle upon Tyne (GB); Josip Andrasec, Cardiff South Glamorgan (GB); Ana Paula Nunes, Cardiff South Glamorgan (GB)

(73) Assignee: Space Forge Limited, Cardiff South Glamorgan (GB)

( * ) Notice: Subject to any disclaimer, the term of this patent is extended or adjusted under 35 U.S.C. 154(b) by 0 days.

(21) Appl. No.: 18/686,767

(22) PCT Filed: Aug. 30, 2022

(86) PCT No.: PCT/GB2022/052213
§ 371 (c)(1),
(2) Date: Feb. 26, 2024

(87) PCT Pub. No.: WO2023/026063
PCT Pub. Date: Mar. 2, 2023

(65) Prior Publication Data
US 2024/0270412 A1    Aug. 15, 2024

(30) Foreign Application Priority Data

Aug. 30, 2022 (GB) ..................... 2112331

(51) Int. Cl.
*B64G 1/58*    (2006.01)
*B64G 1/22*    (2006.01)
*B64G 1/62*    (2006.01)

(52) U.S. Cl.
CPC ............ *B64G 1/58* (2013.01); *B64G 1/2224* (2023.08); *B64G 1/62* (2013.01)

(58) Field of Classification Search
CPC .............................. B64G 1/58; B64G 1/2224
See application file for complete search history.

(56) References Cited

U.S. PATENT DOCUMENTS 3,848,821 A * 11/1974 Scheel ................... E04H 15/26
                                                                                242/899
5,108,047 A *  4/1992 Puech ..................... B64G 1/62
                                                                                244/113

(Continued)

FOREIGN PATENT DOCUMENTS

CN    109455318 A    3/2019
CN    110065652 A    7/2019

(Continued)

OTHER PUBLICATIONS

Manan Arya, et al. "Origami-Inspired Optical Shield for a Starshade Inner Disk Testbed: Design, Fabrication, and Analysis," AIAA 2021-0904. AIAA Scitech 2021 Forum. Jan. 2021. (Year: 2021).*

(Continued)

*Primary Examiner* — Philip J Bonzell
*Assistant Examiner* — Michael B. Kreiner
(74) *Attorney, Agent, or Firm* — Banner & Witcoff, Ltd.

(57) ABSTRACT

Spacecraft Heat Shield A deployable spacecraft atmospheric-entry heat shield (30, 40, 50, 60) is configured in a flasher pattern with a transformable polyhedral-surface. The transformable polyhedral-surface has a plurality of sectors (2, see FIG. 1*a*), each sector (2) having a plurality of mountain fold lines (4, 5), a plurality of valley fold lines (6, 7), a plurality of facets (8) lying between the fold lines (4, 5, 6, 7) and an outside edge (12). The heat shield (30, 40, 50, 60) is configured to unfold from a stowed configuration to a deployed configuration.

11 Claims, 8 Drawing Sheets

(56) References Cited

U.S. PATENT DOCUMENTS

| | | | | |
|---|---|---|---|---|
| 5,853,151 | A * | 12/1998 | Cussac | B64G 1/58 |
| | | | | 102/386 |
| 6,264,144 | B1 * | 7/2001 | Thornton | B64G 1/58 |
| | | | | 244/113 |
| 7,837,154 | B2 * | 11/2010 | Trabandt | B64G 1/62 |
| | | | | 244/172.6 |
| 8,356,774 | B1 * | 1/2013 | Banik | B64G 1/222 |
| | | | | 244/171.1 |
| 10,843,787 | B2 * | 11/2020 | Campbell | F02B 77/11 |
| 10,934,028 | B2 * | 3/2021 | Hocker | B64G 1/58 |
| 11,533,018 | B2 * | 12/2022 | Magleby | H02S 30/20 |
| 2008/0078884 | A1 | 4/2008 | Trabandt et al. | |
| 2016/0297552 | A1 | 10/2016 | Moser et al. | |

FOREIGN PATENT DOCUMENTS

| | | |
|---|---|---|
| CN | 110979744 A | 4/2020 |
| JP | 2001108193 A | 4/2001 |
| RU | 94020218 A | 6/1996 |

OTHER PUBLICATIONS

Bowen, et al. "Dynamic Modeling and Analysis of an Origami-Inspired Optical Shield for the Starshade Spacecraft." Proceedings of the ASME 2016 Conference on Smart Materials, Adaptive Structures and Intelligent Systems. Sep. 28-30, 2016. (Year: 2016).*

Lang, R. J., Magleby, S., and Howell, L. (Mar. 7, 2016). "Single Degree-of-Freedom Rigidly Foldable Cut Origami Flashers." ASME. J. Mechanisms Robotics. Jun. 2016; 8(3): 031005. (Year: 2016).*

Meloni, M., et al. (2021). Engineering Origami: A Comprehensive review of recent applications, design methods, and tools. Advanced Science, 2021(8). (Year: 2021).*

Nathan A. Pehrson, et al. Self-Deployable, Self-Stiffening, and Retractable Origami-Based Arrays for Spacecraft. AIAA Journal 2020 58:7, 3221-3228. Apr. 30, 2020. (Year: 2020).*

Wang, S., et al. Design of deployable curved-surface rigid origami flashers. Mechanism and Machine Theory, vol. 167. Aug. 12, 2021. (Year: 2021).*

David Webb, et al. "Starshade Mechanical Architecture & Technology Effort," AIAA 2016-2165. 3rd AIAA Spacecraft Structures Conference. Jan. 2016. (Year: 2016).*

Shannon A. Zirbel, et al. Deployment Methods for an Origami-Inspired Rigid-Foldable Array. Proceedings of the 40th Aerospace Mechanisms Symposium, NASA Goddard Space Flight Center. May 16, 2014. (Year: 2014).*

Zirbel, S. A., et al. "Accommodating Thickness in Origami-Based Deployable Arrays." ASME. J. Mech. Des. Nov. 2013. (Year: 2013).*

Bowen, L., et al. "Dynamic modeling and analysis of an origami-inspired optical shield for the starshade spacecraft". ASME 2016 Conference on Smart Materials, Adaptive Structures and Intelligent Systems. (Year: 2016).*

Jeremy Shafer. "Origami to Astonish and Amuse", St. Martin's Griffin, 2001, ISBN 0-312-25404-0. pp. 110-111. (Year: 2001).*

Hossain Bhuiyan, et al. "Parametric Studies of Geometric Design Factors on Static and Dynamic Loading of an Origami Flasher." Proceedings of the ASME 2017 Conference on Smart Materials, Adaptive Structures and Intelligent Systems. (Year: 2017).*

Zirbel, Shannon, et al. "Origami-Inspired Folding of Thick, Rigid Panels." NASA Tech Briefs NPO-48861. 2012. (Year: 2012).*

Oct. 26, 2021—(GB) Combined Search and Examination Report—GB2112331.0.

Jan. 8, 2024—(GB) Examination Report—GB2112331.0.

Wu Rui et al., "Flexible heat shields deployed by centrifugal force", Acta Astonautica, Pergamon Press, Elmsford, vol. 152, issue 20, Jul. 2018.

Nov. 25, 2022—(WO) International Search Report and Written Opinion—PCT/GB2022/052213.

Brian Trease, "Solar Power, Origami-Style", Phys Org, Aug. 15, 2014.

Sep. 28, 2024—(CN) Office Action—App No. 202280058546.5.

Jul. 2, 20243—(JP) Office Action—App No. 2024-518099.

* cited by examiner

SPACECRAFT HEAT SHIELD

CROSS-REFERENCE TO RELATED APPLICATIONS

This application is a U.S. National Stage application under 35 U.S.C § 371 of International Application PCT/GB2022/052213, filed Aug. 30, 2022, which claims the benefit of priority to United Kingdom Patent Application GB 2112331.0, filed Aug. 27, 2021. Benefit of the filing date of each of these prior applications are hereby claimed. Each of these prior applications are hereby incorporated by reference in their entirety.

FIELD OF THE INVENTION

The present invention relates to a spacecraft heat shield and more specifically to a deployable spacecraft atmospheric-entry heat shield. A heat shield is an apparatus for thermal protection and deceleration of a spacecraft upon entry of the spacecraft into an atmosphere from space.

BACKGROUND OF THE INVENTION

A spacecraft heat shield is required to prevent excessive heat transfer into a spacecraft during re-entry from Earth orbit or entry into other planetary atmospheres such as those of Mars or Venus (hereafter referred to as atmospheric-entry for simplicity). There are two primary methods of heat dissipation used for atmospheric-entry; ablation and radiation.

An ablative heat shield relies on ablation: the vaporisation of the surface material of the heat shield in order to enable heat to be carried away in the escaping gas and not deposited into the spacecraft. All crewed atmospheric-entry spacecraft in or near operation today (e.g., Soyuz, Shenzhou, Crew Dragon, Starliner) use ablation dominated heat shields, as they have a long heritage and the related physics is well understood.

A radiative heat shield relies on electromagnetic radiation, especially in the infrared range (i.e. thermal radiation), to carry heat away from the heat shield, the amount of energy emitted depends on the temperature on the surface and its ability to emit energy. The potential materials for radiative heat shields in a shuttle type configuration are limited due to the high temperatures reached during atmospheric entry, typically in excess of 2000 K. The temperature that a heat shield reaches is dominated by its area-to-mass ratio. The incoming rate of heat flux ($MW/m^2$) is mainly determined by the ballistic coefficient during atmospheric-entry. This is a measure of the heat shield's ability to overcome air resistance in flight and is equal to the mass divided by the drag coefficient per cross-sectional area of the heat shield (kg/m). For simple geometries the ballistic coefficient is a measure of the aerodynamic drag area-to-total mass ratio.

For example, one example commercial re-entry vehicle currently in service has a ballistic coefficient during re-entry of ~570 $kg/m^2$. The US space shuttle, due to its larger wing area, had a lower ballistic coefficient of ~350 $kg/m^2$. Both of these vehicles can typically reach a heat flux in the single-digit megawatts per meter square area ($MW/m^2$) for several 10 s of seconds during a re-entry from Low Earth Orbit (LEO). In addition, the one example commercial re-entry vehicle currently in service can have a heat shield radiative area of ~0.002 square meters per kilogram of vehicle ($m^2$/kg) and the US space shuttle had a comparable value of ~0.003 $m^2$/kg.

Spacecraft can also require deceleration means, such as parachutes, umbrellas, and/or heat shields which protrude outward of the spacecraft's two dimensions. However, such deceleration means can be bulky. This can be disadvantageous since volume is limited in a launch vehicle or cargo bay of a spacecraft.

SUMMARY OF THE INVENTION

In view of the above, there is a need for a compact heat shield which can provide protection and deceleration to a spacecraft.

A first aspect of the invention provides a deployable spacecraft atmospheric-entry heat shield having a transformable polyhedral-surface comprising: a plurality of sectors, each sector having a plurality of mountain fold lines; a plurality of valley fold lines; a plurality of facets lying between the fold lines; and, an outside edge. The heat shield is configured to unfold from a stowed configuration to a deployed configuration.

The heat shield can be a radiative heat shield.

The transformable polyhedral-surface can comprise a polygon central region of order m from which fold lines extend radially out. The mountain fold lines can comprise major mountain fold lines and minor mountain fold lines and the valley fold lines can comprise major valley fold lines and minor valley fold lines. The major mountain fold lines and the major valley fold lines can extend from the polygon central region. The minor mountain fold lines and the minor valley fold lines can extend between the major mountain fold lines and also the major valley fold lines.

The transformable polyhedral-surface can comprise a radial symmetry of order m about the polygon central region. The plurality of sectors can also be radially symmetrical.

A surface of the heat shield can be formed as an integral sheet material.

The plurality of fold lines of each sector can be configured to substantially restrict angular rotation about a longitudinal axis of the heat shield in use.

The ratio between the polygon central region diameter and outer flat-diameter of the deployed configuration of the transformable polyhedral-surface can be 1:11. The outer flat-diameter is the diameter of the transformable polyhedral-surface if it was forced into a single plane, i.e. flat.

The transformable polyhedral-surface can be configured to adopt a swept back form in the deployed configuration. The deployed configuration can be configured such that the centre of mass of the heat shield (or a spacecraft comprising the heat shield) is behind the polygon central with respect to the normal of the longitudinal axis of the heat shield.

The deployed configuration can be a stable state and a retaining means can be configured to maintain the heat shield in the stowed configuration. The retaining means can be configured to release when an activation threshold is exceeded.

The outside edge can be a circular shape.

A second aspect of the invention provides a deployable spacecraft atmospheric-entry heat shield configured in a flasher pattern. All of the features of the first aspect can be combined with the second aspect.

A third aspect of the invention provides a spacecraft comprising a heat shield as claimed in any one of the preceding claims. All of the features of the first aspect can be combined with the third aspect.

Advantageously the heat shield of the above aspects are deployable in a variety of situations to perform a variety of functions including acting as a heat shield. The heat shield can be compactly sized in a stowed configuration. A compact size is desirable for space applications due to launch volume restrictions. The heat shield is also deployable to a deployed configuration to greatly increase its effective area. This enables the heat shield to efficiently protect a spacecraft from excess heat but also to reduce the speed of a spacecraft during atmospheric entry. This combination of characteristics enables a wider range of materials to be effectively used to manufacture the heat shield. Other advantages will be apparent to the skilled person and are also highlighted herein.

BRIEF DESCRIPTION OF THE DRAWINGS

Embodiments of the invention will now be described with reference to the accompanying drawings, in which:

FIG. 10A is a further thickness accommodating flasher pattern with the minor fold lines omitted defined by parameters m=6, r=3, h=2, with an overlayed dashed circle template.

FIG. 10B is the thickness accommodating flasher pattern of FIG. 10A which has been cut to the dashed circle template of FIG. 10A.

DETAILED DESCRIPTION OF EMBODIMENTS

In general, this description describes a deployable spacecraft atmospheric-entry heat shield (herein, heat shield) which allows for protection and deceleration of a spacecraft during entry into an atmosphere. The spacecraft can be any type of space vehicle or flying body that is to enter or re-enter the atmosphere of the earth or another planet or a planetary moon at a high speed, for which thermal protection (and deceleration) of the spacecraft are needed.

An origami-like pattern is used to enable the heat shield to be deployed from a compact, stowed configuration to a deployed configuration before (and/or during) atmospheric-entry. Origami and similar folding techniques can efficiently pack large deployable space structures into sizes appropriate for launching into space. Traditional origami typically assumes that the thickness of folding material is negligible because in traditional origami, the material is typically paper and treating the thickness of paper as negligible is a valid assumption. However, in structural origami, the material's thickness needs to be accounted for to avoid any undesirable material deformations, and allowing for stronger structures.

Figure 1A:
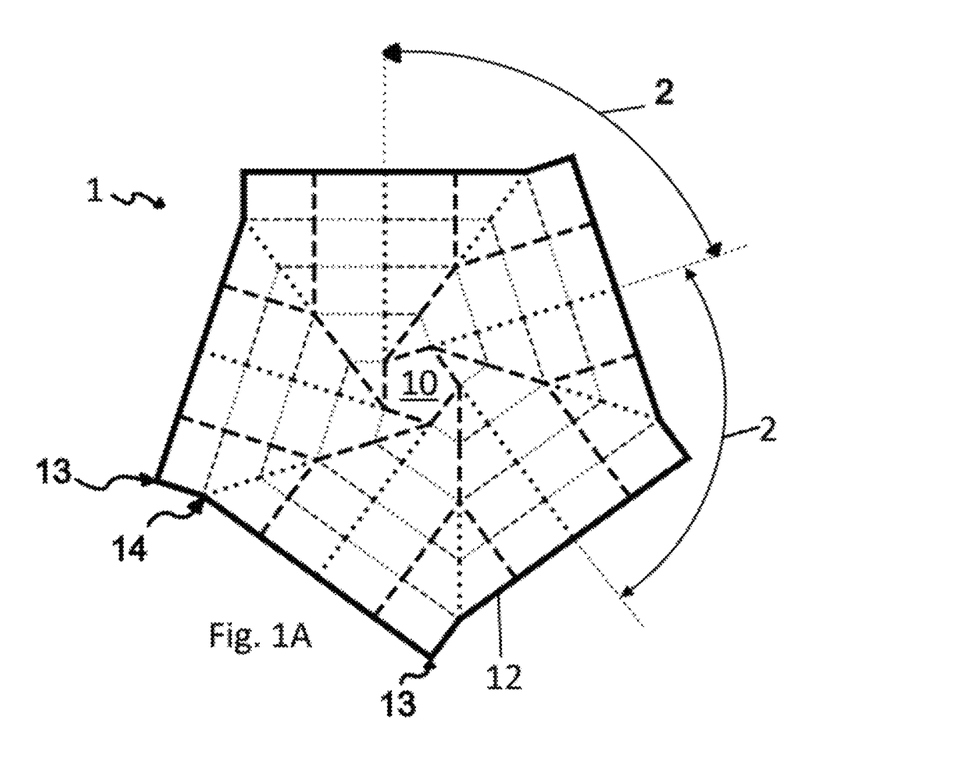
FIG. 1A is an origami pattern known as a flasher pattern which assumes a negligible thickness defined by parameters m=5, r=2, h=2.
Figure 1B:
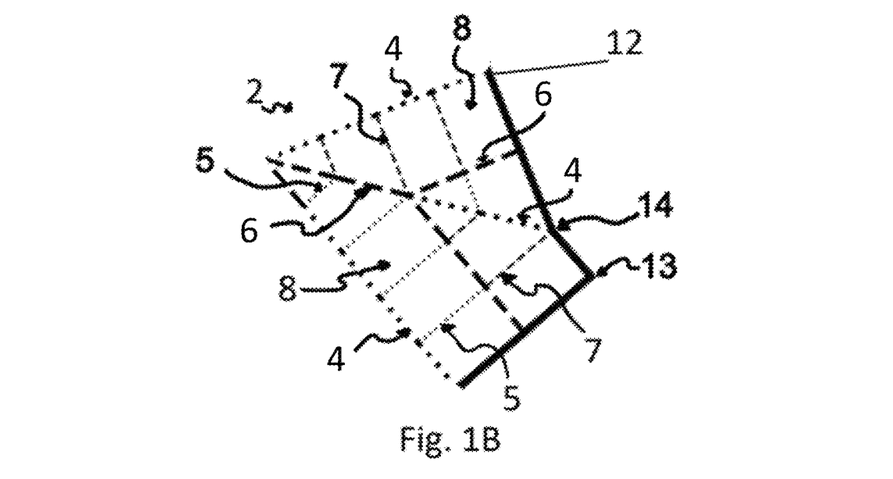
FIG. 1B is a sector of the flasher pattern of FIG. 1A.

FIG. 1A shows an origami pattern known as a flasher pattern 1 which assumes a negligible thickness. This style of origami pattern was originally coined as a 'flasher' by origami author Jeremy Shafer in his book "Origami to Astonish and Amuse", St. Martin's Griffin, 2001, ISBN 0-312-25404-0. However, the term 'flasher' is now well understood and used within technical circles. A flasher pattern is a specific type of transformable polyhedral-surface having a plurality of sectors. A single sector 2 is shown in FIG. 1B. Each sector has a plurality of mountain fold lines 4, 5, a plurality of valley fold lines 6, 7, and a plurality of rigid facets 8 lying between the fold lines. The flasher pattern 1 is shown to have a polygon centre region 10 from which mountain fold lines 4, and valley fold lines 6 extend out to the periphery. In the case of FIGS. 1A and 1B, the polygon centre region 10 is a pentagon.

Figure 2A:
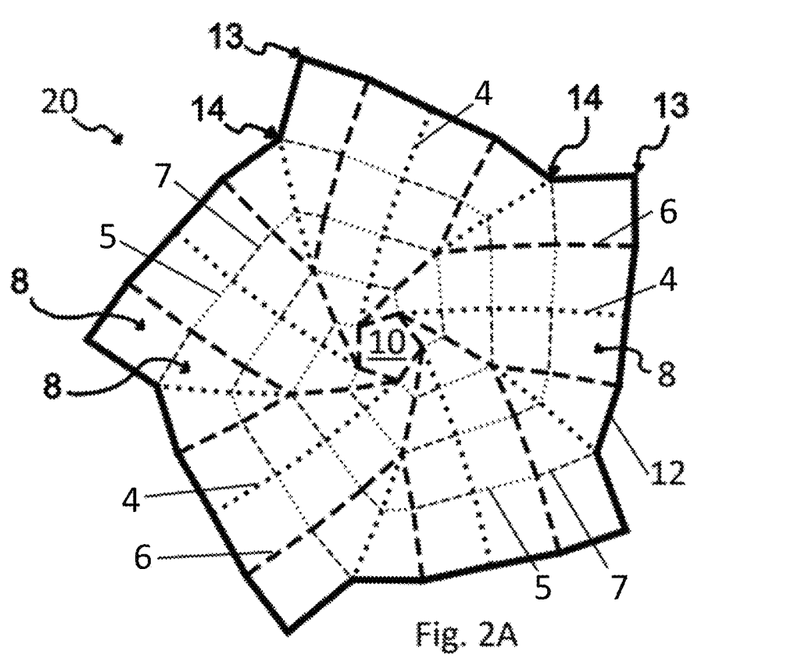
FIG. 2A is a thickness accommodating flasher pattern generated by optimising the flasher pattern of FIG. 1A.

Flasher patterns typically have major and minor fold lines, such that there are major mountain fold lines 4, major valley fold lines 6, minor mountain fold lines 5, and minor valley fold lines 7. The major mountain fold lines 4 are shown in FIGS. 1A-2B as heavy dotted lines. The major valley fold lines 6 are shown in FIGS. 1A-2B as heavy dashed lines. The minor mountain fold lines 5 are shown in FIGS. 1A and 2A as light dotted lines. The minor valley fold lines 7 are shown in FIGS. 1A and 2A as light dashed lines. Facets 8 bordering a major fold line substantially abut when the flasher pattern is in its stowed configuration. In contrast, minor fold lines can be considered as being 'minor' since they fold to a lesser degree, as their purpose is to allow the flasher pattern to roll up in the stowed configuration, as will be apparent from the transformations shown in FIGS. 3A to 6C. Consequently, the major fold lines 4, 6 extend from the polygon central region 10 to an outside edge 12 of the flasher pattern. The minor fold lines 5, 7 branch off from and run between the major fold lines 4, 6, thus creating a complex fold line pattern.

The outside edge 12 has a shape which generally corresponds with the shape of the polygon central region 10; however, where there is a vertex in the polygon central region 10 there are at least two vertices 13, 14 in a stepped configuration in the outside edge 12. Each sector 2 of the flasher pattern 1 comprises at least two vertices 13, 14, such that one vertex 13 defines an angle of 90 degrees or less, and the other vertex 14 defines an obtuse angle (greater than 90 degrees). Within each sector 2, the major fold lines 4, 6 do not extend to at least one vertex 13 of the outside edge 12.

Flasher patterns in general are designed to move from a stowed configuration to a deployed configuration and vice versa in a theoretical single degree of freedom. As the flasher pattern moves from a deployed configuration to a stowed configuration the sectors wrap around the longitudinal axis of the flasher pattern (for the flasher pattern 1 this axis is into the page of FIG. 1A, also shown by reference numeral 32 in FIGS. 3C and 5C). Flasher patterns typically have a deployed configuration which lies substantially normal to said axis of the polygon centre region. The flasher pattern's theoretical single degree of freedom is due to its intended fold line structure, although with enough force the flasher may deform due to material limitations in unintended ways. To put this another way, the fold line pattern of the flasher pattern restricts the expansion to the deployed configuration so that it can only occur in a single way/method (i.e., unwrap from the polygon centre region 10), and any deviation/deformation from this single way/method of expansion may occur if a strong enough external force is applied to the flasher pattern (i.e., applying a force to bend the flasher pattern in its deployed configuration across its diameter—this is a deviation/deformation because it is unintended by the fold pattern). The flasher pattern can have a large difference in diameter between the stowed and deployed configurations, typically 1:5.

Figure 8A:
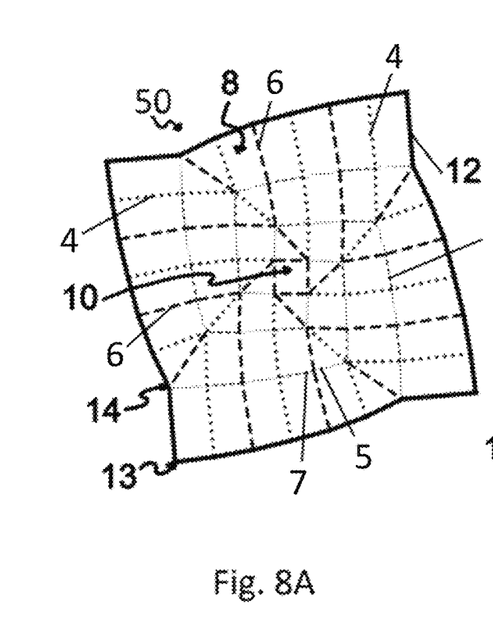
FIG. 8A is a further thickness accommodating flasher pattern with the minor fold lines shown defined by parameters m=4, r=3, h=1.

Beneficially, flasher patterns are mathematically definable. Therefore flasher patterns can be scaled in size and complexity. Flasher patterns can be defined by the parameters m, r and h:

- 'm' is the rotational order of the flasher pattern, i.e., the number of sides of the polygon of the polygon centre region 10 (this is also equal to the number of sectors 2).
- 'r' is the number of rings of the flasher pattern, i.e., the number of layers in each section that will wrap around the polygon centre region 10, equivalently the number of times the diagonal (the fold line(s) which extends from the polygon centre region 10 through the middle of each sector 2) moves from bottom to top and vice versa. For example, as shown in flasher pattern 1, the diagonal extends from the polygon centre region 10 firstly as a major mountain fold line 4 and secondly as a major valley fold line 6. The bottom and top of the flasher pattern can be seen from the stowed configuration (see FIGS. 3A, 5A, and 6A) and are relative to the polygon centre region 10 such that the polygon centre region 10 can be at the top or bottom of the flasher pattern in its stowed configuration depending on orientation.
- 'h' is the height of each ring of the flasher pattern. The height is in units of facets 8 defined by minor fold lines 5, 7, (i.e., before any minor fold lines 5, 7, are removed). For example, flasher pattern 1 in FIG. 1A is shown to have two rings (i.e., r=2) and extending between outside edge 12 and the adjacent ring are two facets 8 of unit height. Therefore, flasher pattern 1 has a height of 2. In another example, flasher pattern 50 in FIG. 8A is shown to have three rings (i.e., r=3) and extending between outside edge 12 and the closest adjacent ring is only one facet 8 of unit height. Therefore, flasher pattern 50 has a height of 1.

For example, the flasher pattern 1 of FIG. 1A has the parameters: m=5, r=2, and h=2.

To produce structural origami (that is, a flasher pattern with a finite thickness material), a flasher pattern is optimised to account for the thickness of the material. Optimisation can be performed using known thickness accommodating theories of origami, such as:

Zirbel, S. A., Lang, R. J., Thomson, M. W., Sigel, D. A., Walkemeyer, P. E., Trease, B. P., Magleby, S. P., and Howell, L. L. (Oct. 3, 2013). "Accommodating Thickness in Origami-Based Deployable Arrays." ASME. J. Mech. Des. November 2013; 135(11): 111005;

Bowen, L., Trease, B., Frecker, M., & Simpson, T. (2016). "Dynamic modeling and analysis of an origami-inspired optical shield for the starshade spacecraft". In Multifunctional Materials; Mechanics and Behavior of Active Materials; Integrated System Design and Implementation; Structural Health Monitoring [V001T01A012] (ASME 2016 Conference on Smart Materials, Adaptive Structures and Intelligent Systems, SMASIS 2016; Vol. 1). American Society of Mechanical Engineers; and, Hossain Bhuiyan, M E, Semer, D, & Trease, B P. "Parametric Studies of Geometric Design Factors on Static and Dynamic Loading of an Origami Flasher." Proceedings of the ASME 2017 Conference on Smart Materials, Adaptive Structures and Intelligent Systems. Volume 1: Development and Characterization of Multifunctional Materials; Mechanics and Behavior of Active Materials; Bioinspired Smart Materials and Systems; Energy Harvesting; Emerging Technologies. Snowbird, Utah, USA. Sep. 18-20, 2017. V001T08A016. ASME.

hereby incorporated by reference herein in their entirety.

Any material thickness can be used as long as the material can fold without breaking. It is understood that a thickness optimised flasher pattern still has all of the characteristics of a flasher pattern, thus, the term flasher pattern may also describe a thickness optimised flasher pattern. However, to avoid confusion herein the term 'thickness accommodating flasher pattern' is used to describe a flasher pattern which has been thickness optimised.

Figure 2B:
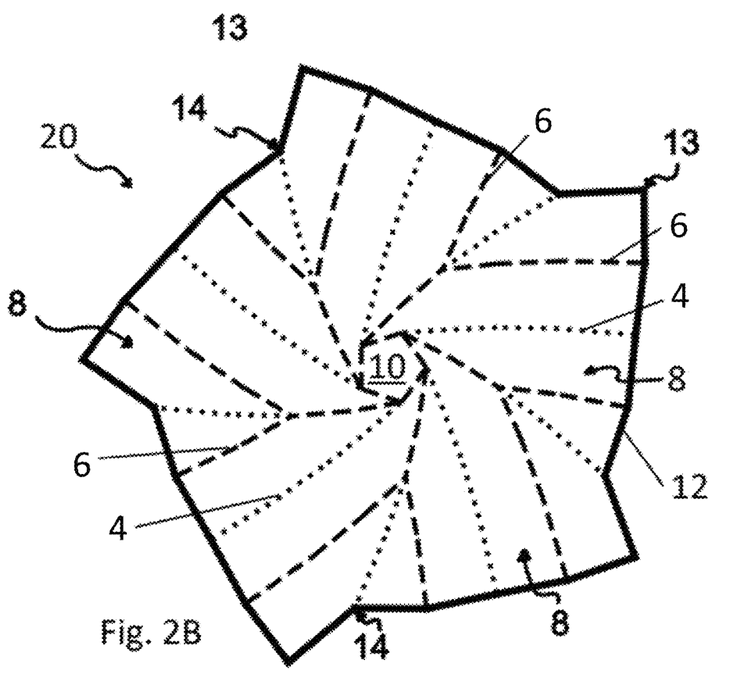
FIG. 2B is a thickness accommodating flasher pattern of FIG. 2A, with minor fold lines omitted.

FIGS. 2A and 2B show a thickness accommodating flasher pattern 20 generated by optimising flasher pattern 1 of FIG. 1A (parameters m=5, r=2, h=2) for use as a deployable spacecraft atmospheric-entry heat shield. The thickness accommodating flasher pattern 20 maintains the same underlying characteristics as the flasher pattern 1 of FIG. 1A. Therefore, corresponding features have been given the same reference numerals. The thickness accommodating flasher pattern 20 can be described as a transformable polyhedral-surface. FIG. 2B shows the thickness accommodating flasher pattern 20 without the minor fold lines 5, 7. A configuration of the thickness accommodating flasher pattern 20 without the minor fold lines 5, 7 can be used when the plurality of facets 8 are non-rigid/elastic. This is because the minor fold lines 5, 7 are not required to allow the facets 8 to bend when the thickness accommodating flasher pattern 20 moves between the stowed configuration and the deployed configuration.

The thickness accommodating flasher pattern 20 is also an example of a fold pattern suitable for a heat shield 30 shown in FIGS. 3A-6C. The characteristics of the thickness accommodating flasher pattern 20 enable the heat shield 30 to deploy from a stowed configuration shown in FIGS. 3A, 4A, 5A, and 6A to a deployed configuration shown in FIGS. 3C, 4C, 5C, and 6C. "Stowed configuration" refers to when the heat shield 30 is folded such that the surface area/outer diameter is minimised. The "deployed configuration" is the disposition in which the shield naturally rests into a semi-folded equilibrium position without the application of any external forces. This state is known as the "no-load" shape and it is determined by a few parameters. The nature of the central polygon and the ratio between the flat outer diameter and the inscribed central polygon diameter will determine the swept-back angle that no-load shape rests in. Also, the rigidity of the shield materials and the joint stiffness will determine the angles in-between plates. The deployed configuration can also be the most stable configuration of the heat shield 30, or the stable configuration of the heat shield 30.

Figure 3A:
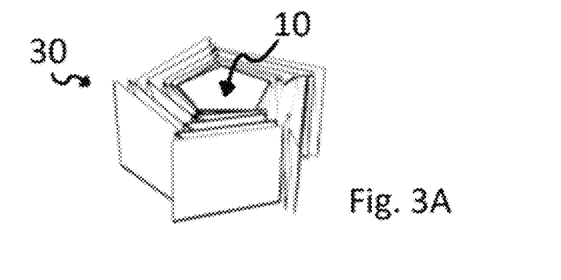
FIG. 3A is an isometric view of the deployable heat shield based on the flasher pattern of FIG. 2A in a stowed configuration.

FIGS. 3A-6C show a deployable heat shield 30 configured in the form of a flasher pattern, specifically, the thickness accommodating flasher pattern 20. FIGS. 3A-3C show the deployable heat shield 30 in an isometric view. FIG. 3A shows the deployable heat shield 30 in the stowed configuration. FIG. 3B shows the deployable heat shield 30 in a partially deployed configuration, which is a snap-shot of the deployable radiative heat shield 30 moving from the stowed configuration to a deployed configuration, or vice versa. FIG. 3C shows the deployable heat shield 30 in the deployed configuration and shows the longitudinal axis 32 as passing through the polygon (pentagon) central region 10 in the direction of intended travel of the deployable spacecraft atmospheric-entry heat shield 30.

The deployable radiative heat shield 30 can be described as having a transformable polyhedral-surface with a plurality of sectors 2, each sector 2 having a plurality of mountain fold lines 4, a plurality of valley fold lines 6, and a plurality of facets 8 lying between the fold lines. The transformable polyhedral-surface has only a single intended degree of freedom, and the heat shield 30 is configured to unfold from a stowed configuration to a deployed configuration in the single degree of freedom, as shown in the progression from FIGS. 3A to 3C. The transformable polyhedral-surface can also have a polygon central region 10 from which fold lines 4, 6 extend radially out to the outside or outer edge 12 of the heat shield 30, similar to flasher pattern 20. The transformable polyhedral-surface also has a radial symmetry about the polygon central region 10, such that the plurality of sectors are radially symmetrical.

In the deployed configuration, the deployable heat shield 30 has an outer diameter of 1.3 m. For this diameter, the radiative heat shield 30 is designed to give a ballistic coefficient of <5 kg/m$^2$ and a mass-to-radiation area of 1 m$^2$/kg, reducing the peak heat flux to <300 kW/m$^2$ and equilibrium temperature to ~1300 K.

The deployable radiative heat shield 30 may be made from a rigid or semi-rigid material, in which case the flasher pattern of the heat shield may define minor mountain fold lines 5 and minor fold lines 7 to enable the heat shield to be deployable from a stowed configuration to a deployed configuration. Examples of such a rigid material may be certain metallic alloys such as steels, titanium alloys, nickle super-alloys and pure elemental metals such as those in the refractory group (or other materials typical to radiative heat shields) or ceramics such as silica based ceramics, and carbon-carbon (or other materials typical to ablative heat shields). Alternatively, the deployable radiative heat shield 30 may be made from an elastic material, in which case the deployable radiative heat shield 30 may not define any minor fold lines 5, 7, and the elastic properties of the material (of each of the facets 8) can enable the deployable radiative heat shield 30 to be deployable from a stowed configuration to a deployed configuration. The material of the deployable radiative heat shield 30 can be a resilient material which can absorb energy when elastically deformed into the stowed configuration without permanent distortion, and released to a stable state upon unloading. Examples of such elastic material may be metals and metallic alloys.

Figure 3B:
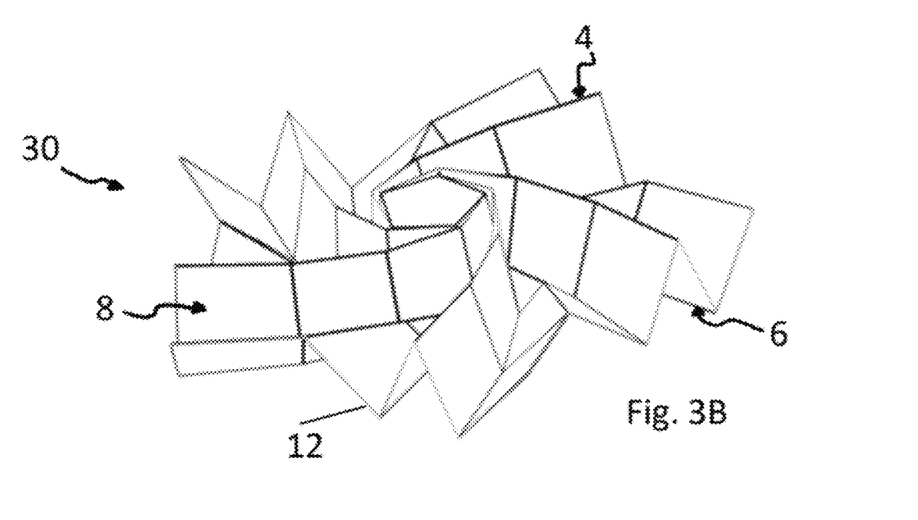
FIG. 3B is an isometric view of the deployable heat shield of FIG. 3A in a partially deployed configuration.
Figure 3C:
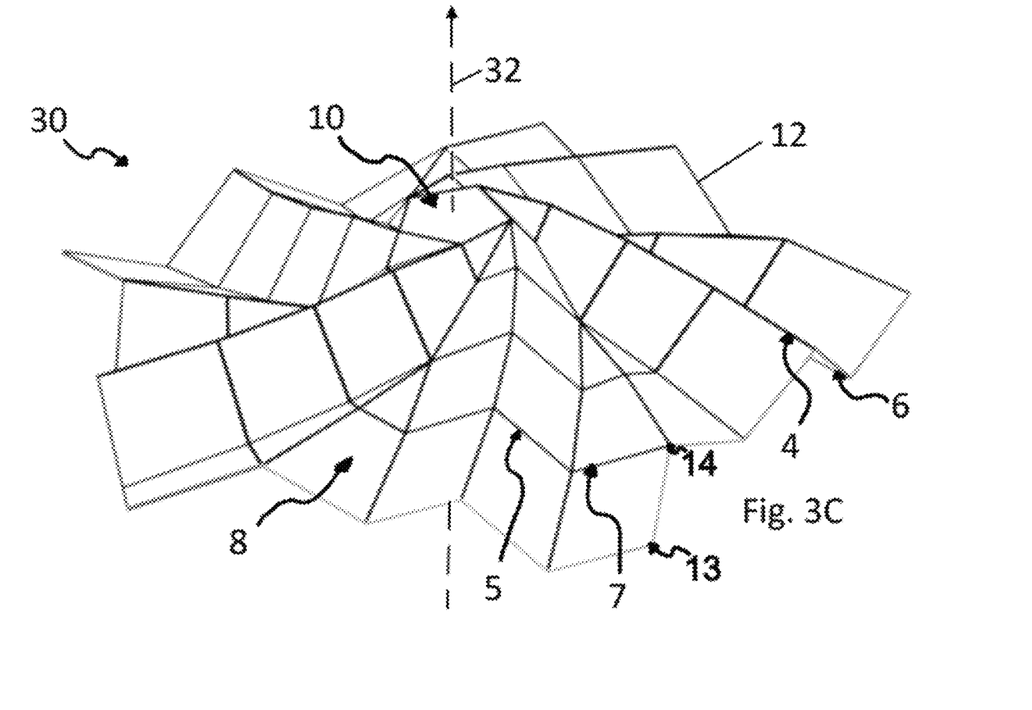
FIG. 3C is an isometric view of the deployable heat shield of FIG. 3A in a fully deployed configuration.

The stowed configuration is shown by FIG. 3A. The outside edge 12 of the deployable radiative heat shield 30, which is apparent in FIGS. 1A, 2A and 3B, is wrapped around the hub (i.e., the polygon (pentagon) centre region 10) as the deployable radiative heat shield 30 is put into the stowed configuration. By stowing the deployable radiative heat shield 30 into the stowed configuration elastic energy can be stored in the fold lines and/or the material of the heat shield. The deployable radiative heat shield 30 can be retained in the stowed position by a retaining means. The heat shield can be configured to unfold from a stowed configuration to a deployed configuration (a stable state of the deployable radiative heat shield 30) under at least the resilient energy of the fold lines and/or the material of the heat shield. By using a spiral wrapping of elastic material (e.g. metals/metallic alloys) stowed configuration of the flasher pattern, the deployable radiative heat shield 30 can be preloaded which simplifies deployment to the no-load shape (i.e. the deployed configuration/stable state) without the need for an active deployment system. In this manner the deployable heat shield 30 is arranged to spring outward once it is released from its deployed position.

The retaining means is used to retain the deployable heat shield 30 in the stowed configuration. The retaining means may be any suitable high tension string, cord, chain, binding, sheet, or the like. The retaining means can be released when an activation threshold is exceeded, such as a temperature, or altitude. The releasing process may take place automatically under certain conditions or may be microprocessor controlled based on the output of sensors, or pre-programmed. The retaining means can be released using a thermal knife system, pyro release system, or other suitable means. Once released the internal strain of the wound deployable radiative heat shield 30 causes rapid self-deployment to the deployed configuration.

Figure 4A:
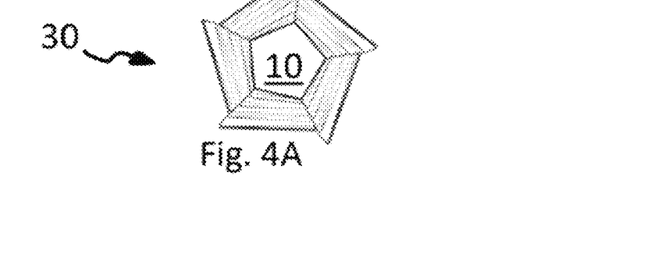
FIG. 4A is a top view of the deployable heat shield of FIG. 3A in a stowed configuration.
Figure 5A:
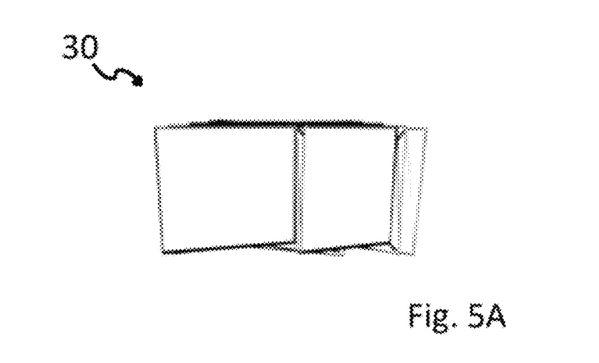
FIG. 5A is a side view of the deployable heat shield of FIG. 3A in a stowed configuration.
Figure 6A:
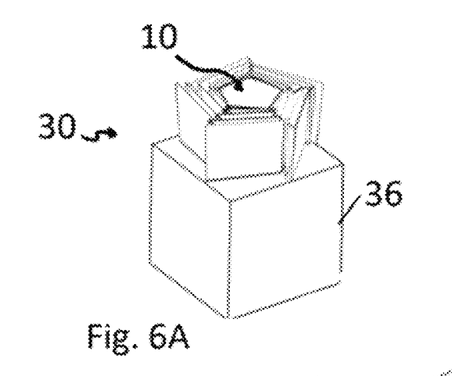
FIG. 6A is an isometric view of the deployable heat shield of FIG. 3A in a stowed configuration mounted on a spacecraft.

FIG. 4A shows the deployable heat shield 30 in the stowed configuration from a top view. FIG. 5A shows the deployable heat shield 30 in the stowed configuration from a side view. FIG. 6A shows the deployable heat shield 30 in the stowed configuration in an isometric view when mounted on a spacecraft via the polygon central region 10.

Figure 4B:
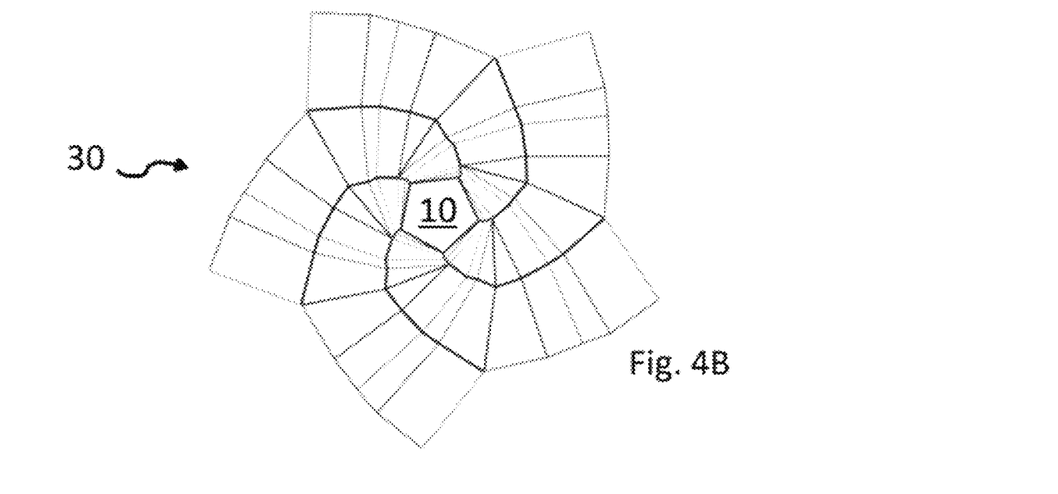
FIG. 4B is a top view of the deployable heat shield of FIG. 3A in a partially deployed configuration.
Figure 5B:
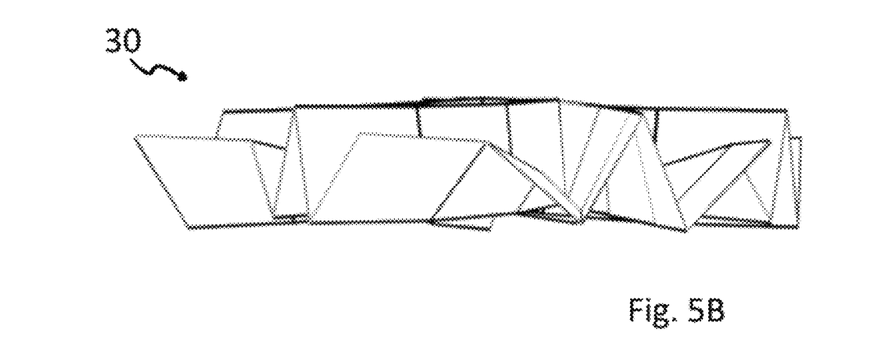
FIG. 5B is a side view of the deployable heat shield of FIG. 3A in a partially deployed configuration.
Figure 6B:
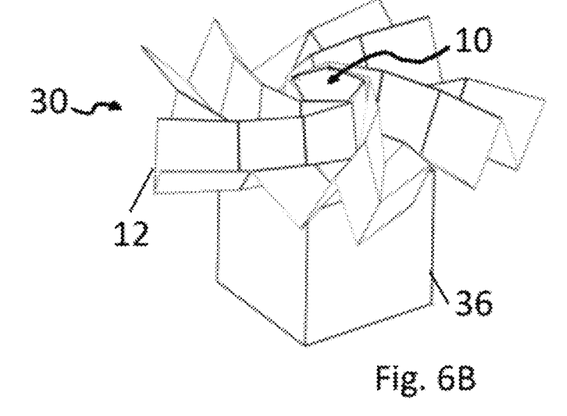
FIG. 6B is an isometric view of the deployable heat shield of FIG. 3A in a partially deployed configuration mounted on the spacecraft.

FIG. 4B shows the deployable heat shield 30 in the partially deployed configuration from a top view. FIG. 5B shows the deployable heat shield 30 in the partially deployed configuration from a side view. FIG. 6B shows the spacecraft mounted deployable heat shield 30 in the deployed configuration.

Figure 4C:
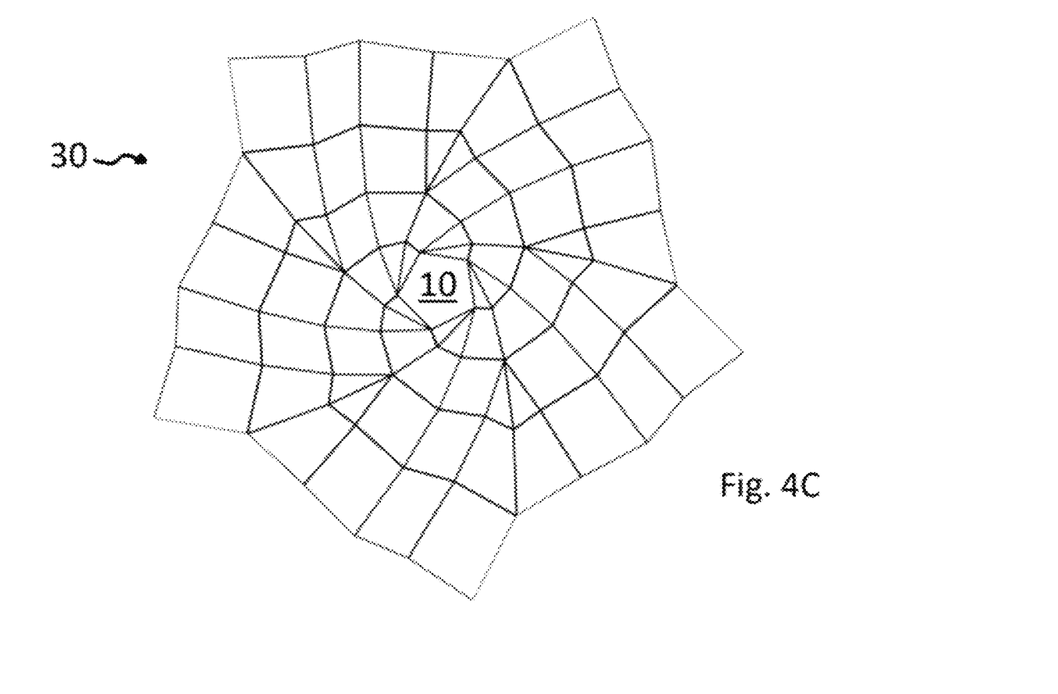
FIG. 4C is a top view of the deployable heat shield of FIG. 3A in a fully deployed configuration.
Figure 5C:
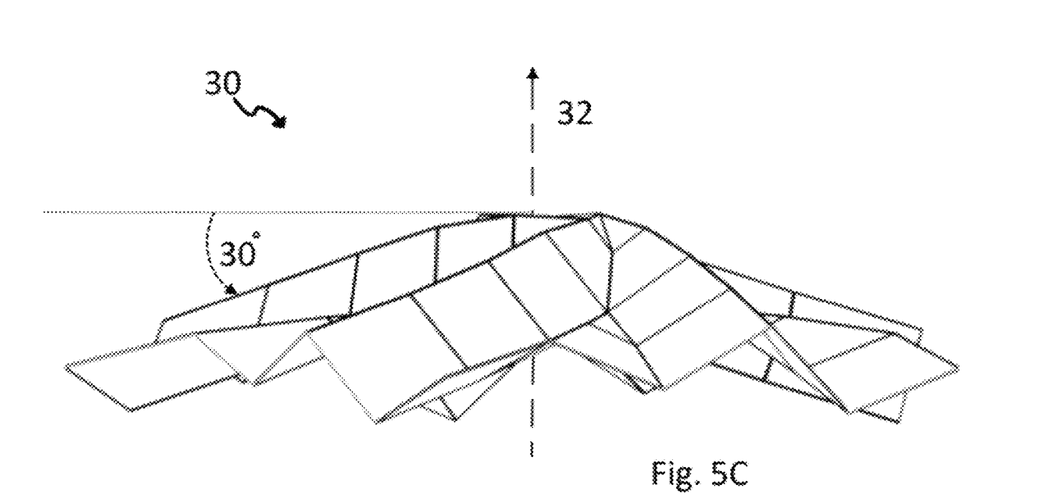
FIG. 5C is a side view of the deployable heat shield of FIG. 3A in a fully deployed configuration.
Figure 6C:
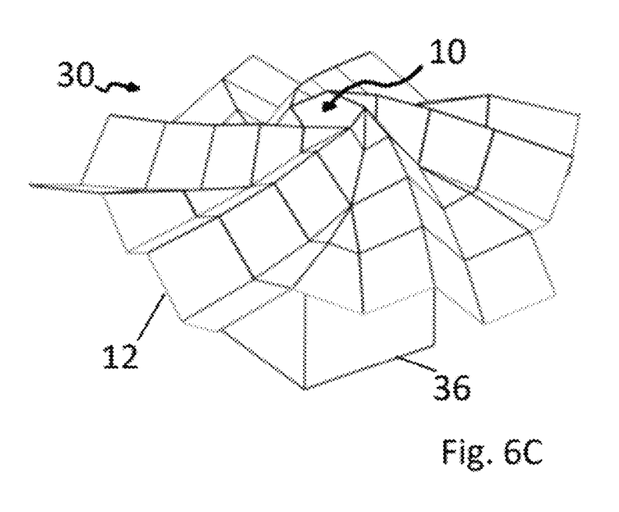
FIG. 6C is an isometric view of the deployable heat shield of FIG. 3A in a fully deployed configuration mounted on the spacecraft.

FIG. 4C shows the deployable radiative heat shield 30 in the deployed configuration from a top view. FIG. 5C shows the deployable radiative heat shield 30 in the partially deployed configuration from a side view. FIG. 6C shows the spacecraft mounted deployable radiative heat shield 30 in its fully deployed configuration.

Advantageously, flasher patterns can be designed with a large differential between the stowed and deployed diameter states (typically 1:5). That is, the diameter of the heat shield in the deployed configuration is greater than the diameter of the heat shield in the stowed configuration.

For the deployable radiative heat shield 30, the ratio between the polygon central region 10 and outer flat-diameter of the flasher shape is 1:11. This enables the pre-deployed deployable radiative heat shield 30 to be compatible with a spacecraft 36 such as a cube format spacecraft (i.e. cubesat), nanosat or other small or large satellite which are typically subject to restricted launch volumes. As mentioned above, a ballistic coefficient of a body is a measure of its ability to overcome air resistance in flight and is equal to the mass divided by the drag coefficient per cross-sectional area. Thus, by using the deployable radiative heat shield 30 with a relatively large deployed diameter a lower ballistic coefficient can be achieved. The inventors have found that a lower ballistic coefficient can reduce the peak heating of a heat shield into the 100 s of $kW/m^2$ level. Therefore, the deployable radiative heat shield 30 can decrease the ballistic coefficient and increase the radiative area-to-mass ratio to a level where the equilibrium temperature during the peak heating of a low Earth orbit re-entry vehicle is lower than the melting point of many metals/metallic alloys that can also withstand the aerodynamic and deployment stresses during a flight. Examples of such metals/metallic alloys are steels, titanium alloys, nickle super-alloys and pure elemental metals such as those in the refractory group.

As shown in FIGS. 6A-6C, when deployed the deployable radiative heat shield 30 is considerably larger in two dimensions than the attached spacecraft 36 and hence extends beyond the spacecraft's primary volume. This enables the deployable radiative heat shield 30 to radiate heat both forwards (into the direction of flight) and backwards, which significantly increases the useful radiative area per kilogram of heat shield material. The backward facing sections of the deployable radiative heat shield 30 are also radiating to a colder environment than the front facing sections (during atmospheric-entry), which further increases heat radiation efficiency.

Advantageously, the deployed configuration of the deployable radiative heat shield 30 leaves a non-flat pattern with significant mountain 4 and valley 6 ridges that increase the total radiative surface area of the deployable radiative heat shield 30 without affecting the total drag area, this allows these two parameters, i.e., total radiative surface area and drag area, to be controlled separately.

The deployable radiative heat shield 30 therefore benefits from increasing the radiative surface area-to-mass ratio and has twin advantages in lowering the peak heat flux (associated with the ballistic coefficient) and increasing the radiative area, which both lead to a lower equilibrium temperature that enables the use of less exotic materials (e.g. ablative materials such as, silica ceramics or carbon-carbon which are hard to produce and machine) for use in the deployable radiative heat shield 30. A low equilibrium temperature during the peak heating of a low Earth orbit (LEO) re-entry of the radiative heat shield 30 can be lower than the melting point of many metals and metallic alloys.

Advantageously, with a low ballistic coefficient, the terminal velocity reduces in atmosphere to a level where a separate fabric parachute may not be required. This is a significant advantage as the deployment of fabric parachutes for atmospheric-entry spacecraft typically require mortar systems and there is significant risk of failure in parachute deployment. Fabric parachutes also reduce the accuracy of landing zone estimation due to the transient inflation and drag properties.

The transformable polyhedral-surface (e.g. flasher pattern) of the deployable radiative heat shield 30 can be formed as an integral sheet material, or with materials with substantially similar thermal conductivity. This allows thermal energy to easily distribute around the deployable radiative heat shield 30 and smooths out temperature hot spots, reducing the risk of uneven heating damaging the deployable radiative heat shield 30. For example, mountain fold lines 4 naturally absorb more thermal energy during atmospheric-entry, however, this is distributed through the sheet material(s) to valley fold-lines 6 and areas which absorb less thermal energy. Metals/metal alloys generally have high thermal conductivity and are therefore suitable materials for the deployable radiative heat shield 30. The overall shape of the deployable heat shield 30 can be etched as a single monolithic piece using a computer controlled metal working tool. This single monolithic piece may then be coated with a high emissivity (>0.8) and low absorptive coating (<0.1) to further reduce the peak heating temperature.

Radiative heat shields in general are more easily reused since they do not rely on surface vaporisation, as opposed to ablative heat shields, which rely on surface vaporisation. Beneficially, the deployable radiative heat shield 30 has a large deployed diameter state and therefore a relatively large radiative area in comparison to typical fixed sized (i.e., non-deployable) radiative heat shields. A larger radiative area enables a greater rate of heat to be radiated away from the system and hence the balance between incoming and outgoing heat occurs at a lower equilibrium temperature.

The transformable polyhedral-surface (e.g., flasher pattern) of the deployable radiative heat shield 30 adopts a swept back form in the deployed configuration as shown in FIG. 5C. The swept back form is a result of the flasher pattern's m-r-h parameters. The swept back form shapes the deployable radiative heat shield 30 into a generally frusto-pyramidal shape as shown by FIG. 5C.

This swept back angle is used to change the centre of pressure along the longitudinal axis 32 (i.e., the flight axis), so it is behind the polygon central region 10 and/or behind the centre of mass of the spacecraft 36. This significantly improves the aerostability of the spacecraft 36 during all stages of atmospheric-entry. For example a ratio of 1:11 between the polygon central region 10 and no-load outer flat-diameter of the transformable polyhedral-surface gives a natural swept back angle of substantially 30 degrees, as shown in FIG. 5C. FIG. 5C shows a swept back form of the deployable radiative heat shield 30 with an angle between the normal to the longitudinal axis and a mountain ridge at the outside edge of the heat shield of 30 degrees. This further enables passive aerostability which reduces requirements on the spacecraft 36 attitude control system to maintain safe pointing during atmospheric-entry (i.e., opposite to the direction of flow, which keeps the platform best protected from the heat). Advantageously, the non-flat pattern with significant mountain 4 and valley 6 ridges (formed via the mountain and valley fold lines) of the deployed configuration of the deployable radiative heat shield 30 also allows for improved passive aerostability.

The transformable polyhedral-surface (e.g., flasher pattern) of the deployable radiative heat shield 30 is configured such that the plurality of fold lines 4, 5, 6, 7 of each sector substantially restrict angular rotation about a longitudinal axis 32 of the deployable radiative heat shield 30. This prevents the deployable radiative heat shield 30 (and the spacecraft 36) from experiencing a rotation during atmospheric-entry, which leads to a higher aerostability in the longitudinal axial direction and easier aerodynamic analysis.

Put another way, the deployed configuration shape of the deployable radiative heat shield 30 is approximately axisymmetric. This provides a flight stabilising function and also resists collapsing back to the stowed position because the air pressure is distributed on opposite sides of the deployable radiative heat shield 30 due to the mountain 4 and valley 6 ridges. This contributes to the deployable radiative heat shield 30 being able to hold the deployed configuration shape without additional holding fixtures.

As mentioned above the material of the deployable radiative heat shield 30 can comprise metal and metal alloys (herein metals). These have many advantages, for example, metals can be worked and formed into customised shapes significantly easier than brittle silica tiles. Metals are not brittle and allow for thermal expansion without cracking. The plastic deformation of metals can also be used to define the desired deployed configuration (i.e., no-load shape) without additional holding fixtures, or additional minor fold lines 5, 7. Metals can be coated with a wider range of materials to improve the corrosion and radiation properties. Metals have a considerably lower sourcing cost and can be machined using more ubiquitous tools, leading to a significantly reduced cost per $m^2$. Metals have predictable and highly linear stress-strain properties over temperature that aid in strength analysis.

The deployable radiative heat shield 30 can be mounted to the spacecraft 36 using the polygon central region 10 onto a custom shield mount that is connected to the forward facing panel of the spacecraft 36. Other mounting methods are possible and would be apparent to the skilled person.

Turning now to alternative heat shields, a heat shield can be an ablative heat shield with many of the characteristics, configurations, and advantages of the deployable radiative heat shield 30, as would be apparent to the skilled person. Ablation requires highly specialised heat shield materials that have a low vaporisation threshold and high thermal capacity. Ablation dominated heat shields are not typically reusable due to the significant erosion of the material that occurs during atmospheric-entry. The ablative heat shield may be made from a rigid material, in which case the flasher pattern of the heat shield may define minor mountain fold lines and minor fold lines to enable the heat shield to be deployable from a stowed configuration to a deployed configuration. Examples of such a rigid material may be ceramics, or other materials typical to ablative heat shields. By stowing the heat shield into the stowed position elastic energy can be stored in the fold lines materials which may be different to the ablative material. The ablative heat shield can also be retained in the stowed position by a retaining means. The ablative heat shield can be configured to unfold from a stowed configuration to a deployed configuration under at least the resilient energy of the fold lines of the heat shield, although additional holding fixtures may be used.

Fold lines of a deployable heat shield (radiative or ablative) can be achieved with surrogate folds, hinges, or any other suitable folding means, e.g., double layered panels with a thin flexible material between them.

The heat shields disclosed herein may additionally comprise holding fixtures, which may be used to support the deployed configuration shape of a deployable heat shield (radiative or ablative) during atmospheric-entry. Holding fixtures may be reinforcing ribs extending along fold lines.

The deployable heat shields disclosed herein may alternatively have a deployed configuration with a swept back form, with an angle between the normal to the longitudinal axis and a mountain ridge at the outside edge of the deployable heat shield between substantially 0-45 degrees, 20-40 degrees, 22-38 degrees, 25-35 degrees, 27-32 degrees. Alternatively, the swept back angle may be substantially 30 degrees.

Alternatively, the diameter ratio of the deployable heat shield to the spacecraft can be any ratio. In particular it may be greater than 2, this would be the case if there were a ratio of 1:11 between the polygon central region and outer flat-diameter of the transformable polyhedral-surface.

Although the transformable polyhedral-surface of the deployable heat shields disclosed herein are shown to be the same as mathematically defined (thickness accommodating) flasher patterns, the heat shields disclosed herein may vary from a strict mathematical definition while still performing substantially the same function, i.e., they are substantially mathematically defined. For example, the deployable heat shields may not have a polygon central region from which fold lines extend radially out. The deployable heat shields may not have a radial symmetry about the polygon central region, such that the plurality of sectors are radially symmetrical. For example, there may be intentional modifications which result in the deployable heat shields not having radial symmetry.

The deployable heat shield technology disclosed herein is scalable from pico (<1 kg) to large (>1000 kg) spacecraft and can be adapted by further adjusting the area-to-mass ratio for re-entry from higher orbits and other planetary bodies, including the Moon and Mars.

The deployable heat shields disclosed herein can also be used as an additional barrier whilst in space, and can consequently behave as a layer of protection against those threats. Differently from other space-deployable structures, the deployable heat shields disclosed herein can be made from resilient materials that can potentially protect a spacecraft from incoming particles, particularly in LEO/space. For example, the deployable heat shields disclosed herein may be used to protect a spacecraft from tail debris when used in comet exploration missions.

The deployable heat shields disclosed herein can also be used as a radiation shield.

The deployable heat shields disclosed herein can also be used as a wake shield to reduce the ambient pressure and atomic oxygen ingress for improved vacuum when in LEO. Simulation results have shown that a deployable heat shield suitable for surviving re-entry also reduces the ambient pressure behind that shield by two orders of magnitude when at altitudes between 400 km and 800 km. This is important for in-orbit manufacturing processes and scientific research that require ultra-high vacuum levels.

The deployable heat shields disclosed herein can also be used as a drag sail to passively decrease the altitude without the use of propellant. A deployable heat shield suitable for surviving re-entry would also lead to a passive reduction in the altitude of a LEO satellite by ~10 km/month (dependent upon solar activity). This is useful for re-entry missions as it saves on the propellant required to manoeuvre into a low orbit to prepare for re-entry (where a lower starting point leads to a higher precision of landing zone).

The deployable heat shields disclosed herein can also be used as a flotation device, where the large relative water displacement of the swept back shield and the high centre of volume ensures static stability in light to moderate seas. This allows the heat shield to replace the need for a separate flotation device deployment system which would require additional resources and come with deployment risks.

The deployable heat shields disclosed herein function can be made based on any mathematically definable thickness accommodating flasher pattern/mathematically definable transformable polyhedral-surface. It will be understood that the parameters m=5, r=2, h=2 used for FIGS. 1-6C was selected for illustrative purposes, and any type of flasher pattern/transformable polyhedral-surface which can be substantially defined by m-r-h parameters may be used to create a deployable heat shield as disclosed herein. Examples of other flasher patterns with alternative m-r-h parameters are shown with reference to FIGS. 7A-9B.

Figure 7A:
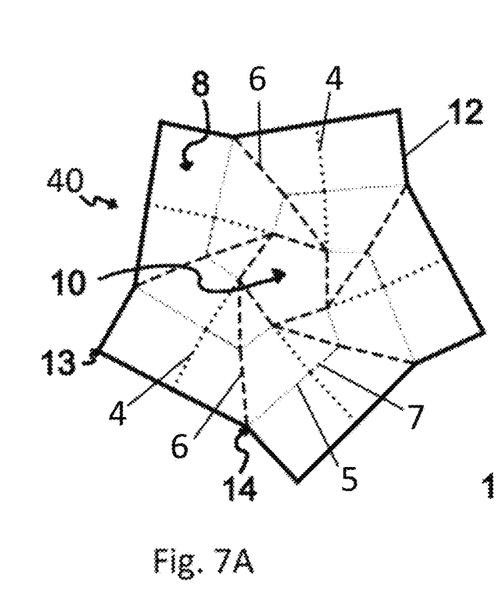
FIG. 7A is a further thickness accommodating flasher pattern with the minor fold lines shown defined by parameters m=5, r=1, h=2.
Figure 7B:
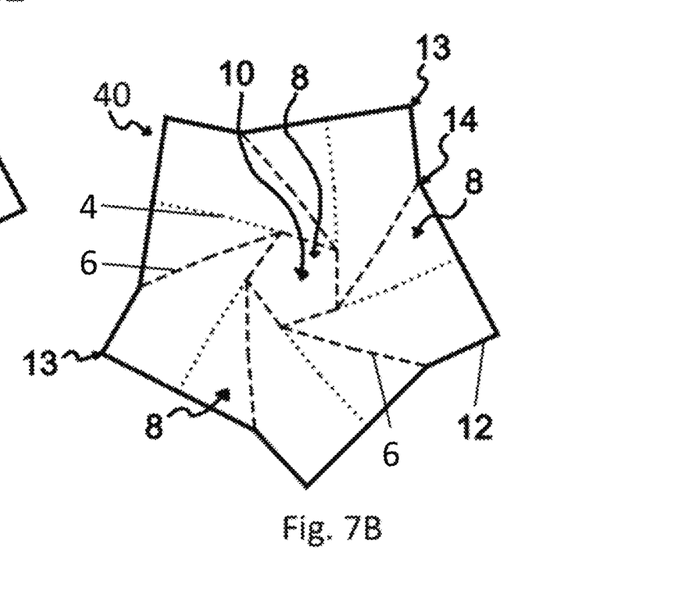
FIG. 7B is the thickness accommodating flasher pattern of FIG. 7A with the minor fold lines omitted.

FIGS. 7A and 7B show an alternative thickness accommodating flasher pattern 40 with parameters of m=5, r=1, h=2. FIG. 7A shows the thickness accommodating flasher pattern 40 with the minor fold lines shown, and FIG. 7B shows the thickness accommodating flasher pattern 40 without the minor fold lines shown.

Figure 8B:
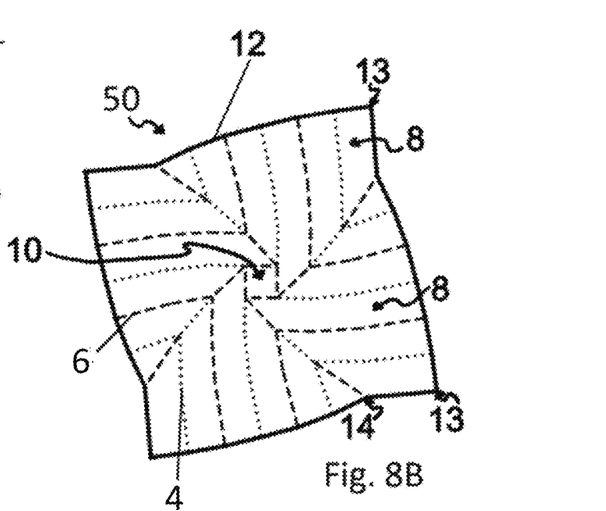
FIG. 8B is the thickness accommodating flasher pattern of FIG. 8A with the minor fold lines omitted.

FIGS. 8A and 8B show an alternative thickness accommodating flasher pattern 50 with parameters of m=4, r=3, h=1. FIG. 8A shows the thickness accommodating flasher pattern 50 with the minor fold lines shown, and FIG. 8B shows the thickness accommodating flasher pattern 50 without the minor fold lines shown.

Figure 9A:
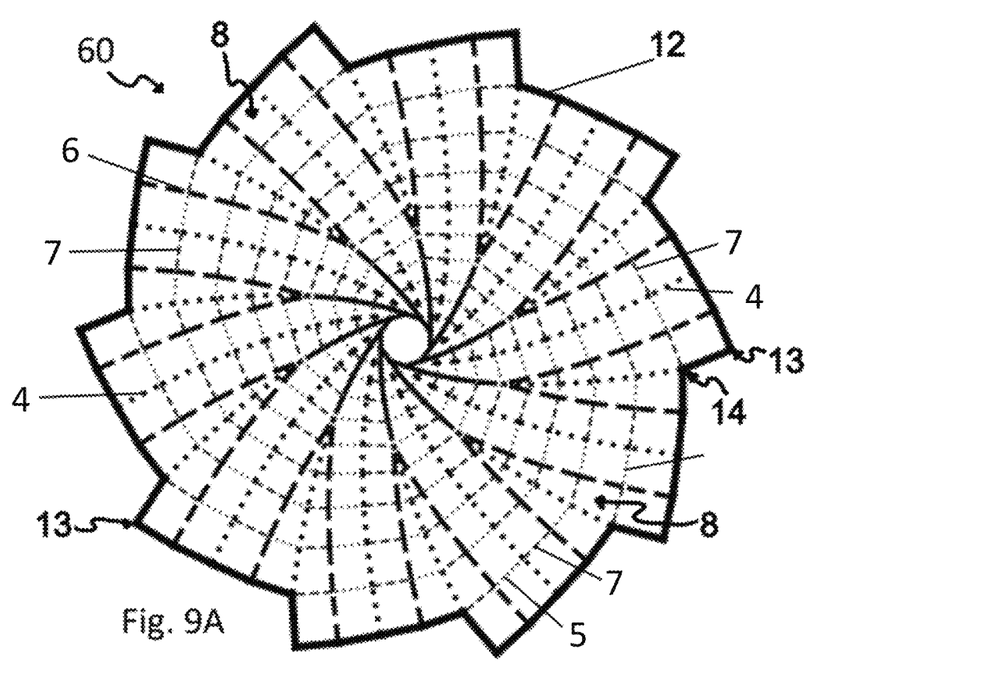
FIG. 9A is a further thickness accommodating flasher pattern with the minor fold lines shown defined by parameters m=10, r=2, h=5.
Figure 9B:
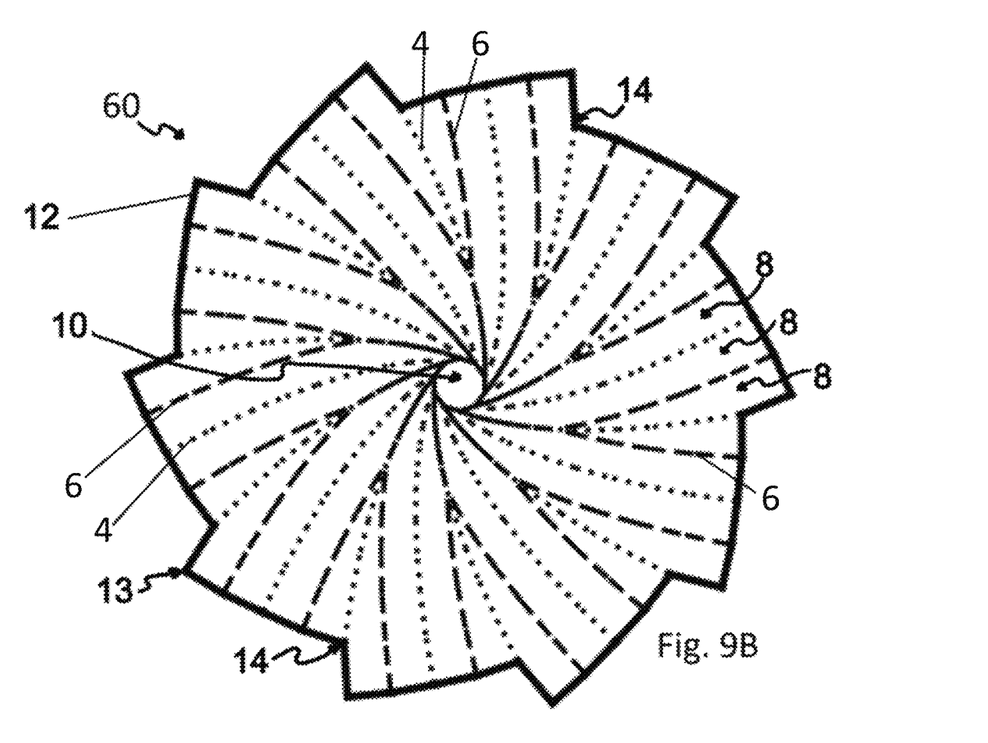
FIG. 9B is the thickness accommodating flasher pattern of FIG. 9A with the minor fold lines omitted.

FIGS. 9A and 9B show an alternative thickness accommodating flasher pattern 60 with parameters of m=10, r=2, h=5. FIG. 9A shows the thickness accommodating flasher pattern 60 with the minor fold lines shown, and FIG. 9B shows the thickness accommodating flasher pattern 60 without the minor fold lines shown.

FIGS. 10A and 10B show an alternative thickness accommodating flasher pattern 70 with the minor fold lines omitted, and defined by parameters m=6, r=3, h=2. FIG. 10A shows the flasher pattern 70 with an overlayed dashed circle 80. FIG. 10B shows a thickness accommodating flasher pattern 90 which is the thickness accommodating flasher pattern 70 cut to the dashed circle 80 i.e., the thickness accommodating flasher pattern 90 is a 'circularized' thickness accommodating flasher pattern. The outside edge 12 of the thickness accommodating flasher pattern 90 corresponds to the dashed circle 80. Therefore, the outside edge 12 of the thickness accommodating flasher pattern 90 corresponds to a circular shape (i.e., the outside edge 12 is circular). Specifically, if the transformable polyhedral-surface was forced into a single plane, i.e. flat, then the outside edge 12 would be a circle. This is preferably done in the design phase. The thickness accommodating flasher pattern 90 is dimensioned based on its radius such that the outer flat-diameter can be defined by the radius of the dashed circle 80. The thickness accommodating flasher pattern 90 can provide improved aerostability over the thickness accommodating flasher pattern 70. Any thickness accommodating flasher pattern may be modified to provide an outside edge 12 which substantially corresponds to a circle, and then benefit from improved aerostability.

Although the invention has been described above with reference to one or more preferred embodiments, it will be appreciated that various changes or modifications may be made without departing from the scope of the invention as defined in the appended claims.

The invention claimed is:

1. A deployable spacecraft atmospheric-entry heat shield having a transformable polyhedral-surface comprising:
a polygon central region of order m; and
a plurality of sectors disposed around the central region, each sector having a plurality of mountain fold lines, a plurality of valley fold lines, a plurality of facets lying between the fold lines, and an outside edge,
wherein:
the plurality of mountain fold lines comprise a plurality of major mountain fold lines and minor mountain fold lines;
the plurality of valley fold lines comprise a plurality of major valley fold lines and minor valley fold lines;
the major mountain fold lines and the major valley fold lines extend from the central region to the outside edge;
the heat shield is configured to unfold from a stowed configuration to a deployed configuration,
the transformable polyhedral-surface is configured to adopt a swept back form in the deployed configuration; and
the major mountain fold lines have a swept back angle that is substantially constant from the polygon central region to the outside edge in the deployed configuration.

2. The heat shield of claim 1, wherein the heat shield is a radiative heat shield.

3. The heat shield of claim 1, wherein the minor mountain fold lines and the minor valley fold lines extend between the major mountain fold lines and the major valley fold lines.

4. The heat shield of claim 1, wherein the transformable polyhedral-surface comprises a radial symmetry of order m about the polygon central region, wherein the plurality of sectors are radially symmetrical.

5. The heat shield of claim 1, wherein a surface of the heat shield is formed as an integral sheet material.

6. The heat shield of claim 1, wherein the plurality of fold lines of each sector are configured to substantially restrict angular rotation about a longitudinal axis of the heat shield in use.

7. The heat shield of claim 1, wherein the ratio between a diameter of the polygon central region and an outer flat-diameter of the deployed configuration of the transformable polyhedral-surface is 1:11.

8. The heat shield of claim 1, wherein the deployed configuration is configured such that the centre of mass of the heat shield is behind the polygon central region with respect to the normal of a longitudinal axis of the heat shield.

9. The heat shield of claim 1, wherein the deployed configuration is a stable state and a retaining means is configured to maintain the heat shield in the stowed configuration.

10. The heat shield of claim 9, wherein the retaining means is configured to release when an activation threshold is exceeded.

11. A spacecraft comprising a heat shield having a transformable polyhedral-surface comprising:
a polygon central region of order m; and
a plurality of sectors disposed around the central region, each sector having a plurality of mountain fold lines, a plurality of valley fold lines, a plurality of facets lying between the fold lines, and an outside edge,
wherein:
the plurality of mountain fold lines comprise a plurality of major mountain fold lines and minor mountain fold lines;
the plurality of valley fold lines comprise a plurality of major valley fold lines and minor valley fold lines;
the major mountain fold lines and the major valley fold lines extend from the central region to the outside edge;
the heat shield is configured to unfold from a stowed configuration to a deployed configuration;
the transformable polyhedral-surface is configured to adopt a swept back form in the deployed configuration; and the major mountain fold lines have a swept back angle that is substantially constant from the polygon central region to the outside edge in the deployed configuration.

* * * * *